US007630528B2

(12) United States Patent
Kohler et al.

(10) Patent No.: US 7,630,528 B2
(45) Date of Patent: Dec. 8, 2009

(54) MOTION COMPENSATION

(75) Inventors: Thomas Kohler, Norderstedt (DE); Michael Grass, Buchholz in der Nordheide (DE); Tim Nielsen, Hamburg (DE); Peter Koken, Hamburg (DE)

(73) Assignee: Koninklijke Philips Electronics N.V., Eindhoven (NL)

( * ) Notice: Subject to any disclaimer, the term of this patent is extended or adjusted under 35 U.S.C. 154(b) by 705 days.

(21) Appl. No.: 10/598,421

(22) PCT Filed: Feb. 23, 2005

(86) PCT No.: PCT/IB2005/050655

§ 371 (c)(1),
(2), (4) Date: Aug. 29, 2006

(87) PCT Pub. No.: WO2005/088543

PCT Pub. Date: Sep. 22, 2005

(65) Prior Publication Data

US 2007/0183639 A1    Aug. 9, 2007

(30) Foreign Application Priority Data

Mar. 2, 2004    (EP) .................... 04100827

(51) Int. Cl.
*G06K 9/00*    (2006.01)
*A61B 6/00*    (2006.01)
(52) U.S. Cl. ............................ 382/128; 382/275; 378/4

(58) Field of Classification Search ................. 382/100, 382/107, 128, 129, 130, 131, 132, 133, 134, 382/168, 173, 178, 181, 203, 232, 255, 256, 382/260, 274, 275, 276, 291, 305, 312; 378/8, 378/21, 24, 4; 600/410; 428/195.1
See application file for complete search history.

(56) References Cited

U.S. PATENT DOCUMENTS

| | | | |
|---|---|---|---|
| 5,035,244 A * | 7/1991 | Stokar | 600/410 |
| 5,241,608 A * | 8/1993 | Fogel | 382/107 |
| 6,103,350 A * | 8/2000 | Grangeat et al. | 428/195.1 |
| 6,535,570 B2 * | 3/2003 | Stergiopoulos et al. | 378/8 |

FOREIGN PATENT DOCUMENTS

WO    WO 99/33024 A1    7/1999

OTHER PUBLICATIONS

Dhanantwari, A.C., et al.; Adaptive Processing to Correct for Organ Motion Artifacts in X-Ray CT Medical Imaging Systems; 2000; IEEE-Sensor Array and Multichannel Signal Processing Workshop; pp. 261-265.*

(Continued)

*Primary Examiner*—Seyed Azarian

(57) ABSTRACT

Using only projection data in one temporal gating window around a certain target phase point may lead to motion artifacts such as blurred images. By using projection data corresponding to three temporal gating windows, which are slightly shifted with respect to each other but at least partially overlap, motion within the gating window may be estimated and, according to an exemplary embodiment of the present invention, this estimation may be used for improving the image quality. Advantageously, only the projection data inside the at least partially overlapping gating windows are used for reconstruction and motion compensation.

11 Claims, 6 Drawing Sheets

OTHER PUBLICATIONS

Mair, B.A., et al.; Simultaneous Motion Estimation and Image Reconstruction From Gated Data; 2002; IEEE-Biomedical Imaging Symposium; pp. 661-664.*

Taguchi, K.; Temporal resolution and the evaluation of candidate algorithms for four-dimensional CT; 2003; Med. Phys.; 30(4)640-650.Abstract.*

Dhanantwari, A.C., et al.; Adaptive Processing to Correct for Organ Motion Artifacts in X-Ray CT Medical Imaging Systems; 2000; IEEE-Sensor Array and Multichannel Signal Processing Workshop; pp. 261-265.

Grass, M., et al.; Helical cardiac cone beam reconstruction using retrospective ECG gating; 2003; Phys. Med. Biol.; 48:3069-3084.

Mair, B.A., et al.; Simultaneous Motion Estimation and Image Reconstruction From Gated Data; 2002; IEEE-Biomedical Imaging Symposium; pp. 661-664.

Ritchie, C.J., et al.; Correction of Computed Tomography Motion Artifacts Using Pixel-Specific Back-Projection; 1996; IEEE Trans. on Medical Imaging; 15(3)333-342.

Schaffter, T., et al.; Motion Compensated Projection Reconstruction; 1999; Magnetic Resonance in Medicine; 41:954-963.

Taguchi, K.; Temporal resolution and the evaluation of candidate algorithms for four-dimensional CT; 2003; Med. Phys.; 30(4)640-650.Abstract.

* cited by examiner

MOTION COMPENSATION

The present invention relates to the field of image processing, for example in medical applications. In particular, the present invention relates to a method of motion compensation in a projection data set of an object of interest, to data processing devices and to respective computer programs.

Motion is one of the most critical sources of artifacts in positron emission tomography (PET), single photon emission computed tomography (SPECT) and computed tomography (CT), particularly in cardiac helical cone-beam CT.

Conventionally, the object of interest needs to be fixed both in position and direction during the measurement period. Such stationary posture may be very painful to a human body or an animal. Also, a significantly long scan time may lead to significant losses of resolution due to patient or organ motion, in particular for heart and thorax imaging where heart and breathing motion is present during the data acquisition. Also, artifacts due to a motion or deformation of the object of interest appear in the image obtained by image reconstruction.

In cardiac helical cone-beam CT data are often acquired using a low pitch helical scan and an electro-cardiogram (ECG) is recorded simultaneously. For reconstruction, a certain position P within the cardiac cycle is selected and only projection data in a temporal gating window $T=[p-\Delta;p+\Delta]$ around this position are used. It is assumed that the heart did not move within the window T. However, this is only true approximately, leading to blurred images or images comprising motion artifacts.

Various motion compensation techniques are known in the art, which use a plurality of disjunct or non-overlapping gating windows in order to allow for a motion detection and a following compensation of the motion.

It is an object of the present invention to provide for improved image quality.

According to an exemplary embodiment of the present invention as set forth in claim 1, the above object maybe solved by a method of motion compensation in a projection data set of an object of interest. According to this exemplary embodiment of the present invention, a first gating window comprising first projection data and a second gating window comprising second projection data are selected. After that, a motion of the object of interest on the basis of the projection data of the first and second gating windows is estimated and a motion compensated reconstruction on the basis of the motion estimation is performed, wherein the first and second gating windows at least partially overlap on a time axis.

In other words, a plurality of gating windows comprising projection data are used for detecting motion inside the objects of interest. Advantageously, the gating windows are not disjunct or timely separated but the different gating windows do at least partially overlap. The overlap may allow for a reduction of projection data required for motion detection and compensation.

According to another exemplary embodiment of the present invention as set forth in claim 2, the estimation of motion comprises the step of generating a motion map for the object of interest on the basis of the projection data of the first and second gating windows, wherein the motion compensated reconstruction is performed on the basis of the motion map.

Advantageously, this may allow for an exact motion estimation for the entire object of interest or, if desired, for only parts of the object of interest.

According to another exemplary embodiment of the present invention as set forth in claim 3, the selection of the first gating window and the second gating window is performed by the selection of a first phase point and a determination of the first gating window comprising first projection data, wherein the first gating window corresponds to the first phase point. Furthermore, a selection of a second phase point on the basis of the first phase point is performed and a second gating window comprising second projection data is determined, wherein the second gating window corresponds to the second phase point.

Advantageously, according to this exemplary embodiment of the present invention, the first phase point may be selected on the basis of the heart cycle of a patient, allowing for a minimization of motion artifacts inside the gating window, since the first phase point may be selected at a point in time where motion of the heart is minimal. Furthermore, according to this exemplary embodiment of the present invention, the width of the first gating window and the width of the second gating window may be selected on the basis of the individual heart cycle, allowing for a minimization of projection data used for reconstruction of the image.

According to an other exemplary embodiment of the present invention as set forth in claim 4, the generation of the motion map is performed by reconstructing a first image on the basis of the first projecting data and reconstructing a second image on the basis of the second projection data. After that, motion of an average position for each point of interest on the basis of the projection data of the first and second gating windows is determined, resulting in the motion map.

Advantageously, according to this exemplary embodiment of the present invention, motion is determined by analyzing reconstructed images basing on projection data from different time intervals or overlapping gating windows.

According to an other exemplary embodiment of the present invention as set forth in claim 5, the motion compensated reconstruction on the basis of the motion map comprises the steps of forward projecting the first image by using the motion map, resulting in forward projected first image data. After that, a difference between the forward projected first image data and the measured projection data is determined and a back-projection of the difference by using the motion map is performed. After that, the first image is updated on the basis of the back-projected difference.

Advantageously, the above method takes a motion or deformation of the object of interest into account. Furthermore, it may still allow to maximize a likelihood function. Overall, according to this exemplary embodiment of the present invention, even in the presence of motion or motion artifacts in the object of interest, a proper reconstruction may be realized, yielding in a sharp image with a high signal-to-noise ratio.

Another exemplary embodiment of the present invention as set forth in claim 6 provides for a method of motion compensation, wherein the motion compensated reconstruction is performed iteratively until an end criterion has been fulfilled. Advantageously, this may allow for improved image quality.

According to another exemplary embodiment of the present invention as set forth in claim 7, the second phase point is negatively shifted on the time axis with respect to the first phase point. Advantageously, the amount of the shifts may be set depending on individual parameters of the object of interest, e.g. the amount of motion inside the object of interest, which may be a heart of a patient.

According to another exemplary embodiment of the present invention as set forth in claim 8, the projection data set is acquired by means of a source of electromagnetic radiation generating a beam and by means of a radiation detector detecting the beam, wherein the source of electromagnetic radiation is a polychromatic x-ray source, which moves along a helical path around the object of interest. Furthermore, the beam has one of a cone-beam geometry and a fan-beam geometry.

The application of a polychromatic x-ray source is advantageous, since polychromatic x-rays are easy to generate and provide a good image resolution. It should be noted that, since the geometry of the CT scanner system may be of different designs, such as, for example, cone-beam or fan-beam geometry, a method for an exemplary embodiment of the present invention may be applied to a plurality of different scanner systems and may not be limited to CT scanner systems, but may be applied to PET (positron emission tomography) scanner systems or SPECT (single photon emission computed tomography) scanner systems.

Another exemplary embodiment of the present invention as set forth in claim 9 provides for a data processing device for reconstructing an image from projection data, which takes into account a motion and/or deformation of the object of interest by performing a motion compensated reconstruction of the image on the basis of the projection data, wherein the motion compensated reconstruction is performed for the object of interest on the basis of the motion estimation, wherein the first, second and third gating windows do at least partially overlap on a time axis.

According to another exemplary embodiment of the present invention as set forth in claim 10, the estimation of motion performed by the data processing device comprises the step of generating a motion map for the object of interest on the basis of the projection data of the first and second gating windows, wherein the motion compensated reconstruction is performed on the basis of the motion map.

According to another exemplary embodiment of the present invention as set forth in claim 11, a CT scanner system is provided, comprising a memory for storing a data set and a data processor for performing motion compensation in a projection data set of an object of interest according to an exemplary embodiment of a method according to the present invention.

The present invention also relates to a computer program, which may, for example, be executed on a processor, such as an image processor. Such a computer program may be part of, for example, a CT scanner system. The computer program, according to an exemplary embodiment of the present invention, is set forth in claim 11. The computer program may be preferably loaded into working memories of data processors. The data processors are thus equipped to carry out exemplary embodiments of the methods of the present invention. The computer program may be written in any suitable programming language, for example, in C++ and may be stored on a computer readable medium, such as a CD-ROM. Also, these computer programs may be available from a network, such as the WorldWideWeb, from which they may be downloaded into image processing units or processors, or any suitable computers.

It may be seen as the gist of an exemplary embodiment of the present invention that motion in a projection data set of an object of interest is detected by using a plurality of at least partially overlapping gating windows comprising projection data and that motion inside the gating windows is compensated for by reconstructing only the projection data inside that least partially overlapping gating windows. No reconstruction of projection data outside the gating windows has to be performed. Advantageously, according to an exemplary embodiment of the present invention, the gating windows are only slightly shifted with respect to each other, resulting in a large overlap and therefore comprise almost the same projection data.

These and other aspects of the present invention will become apparent from and will be elucidated with reference to the embodiment described hereinafter.

Exemplary embodiments of the present invention will be described in the following, with reference to the following drawings.

Figure 1:
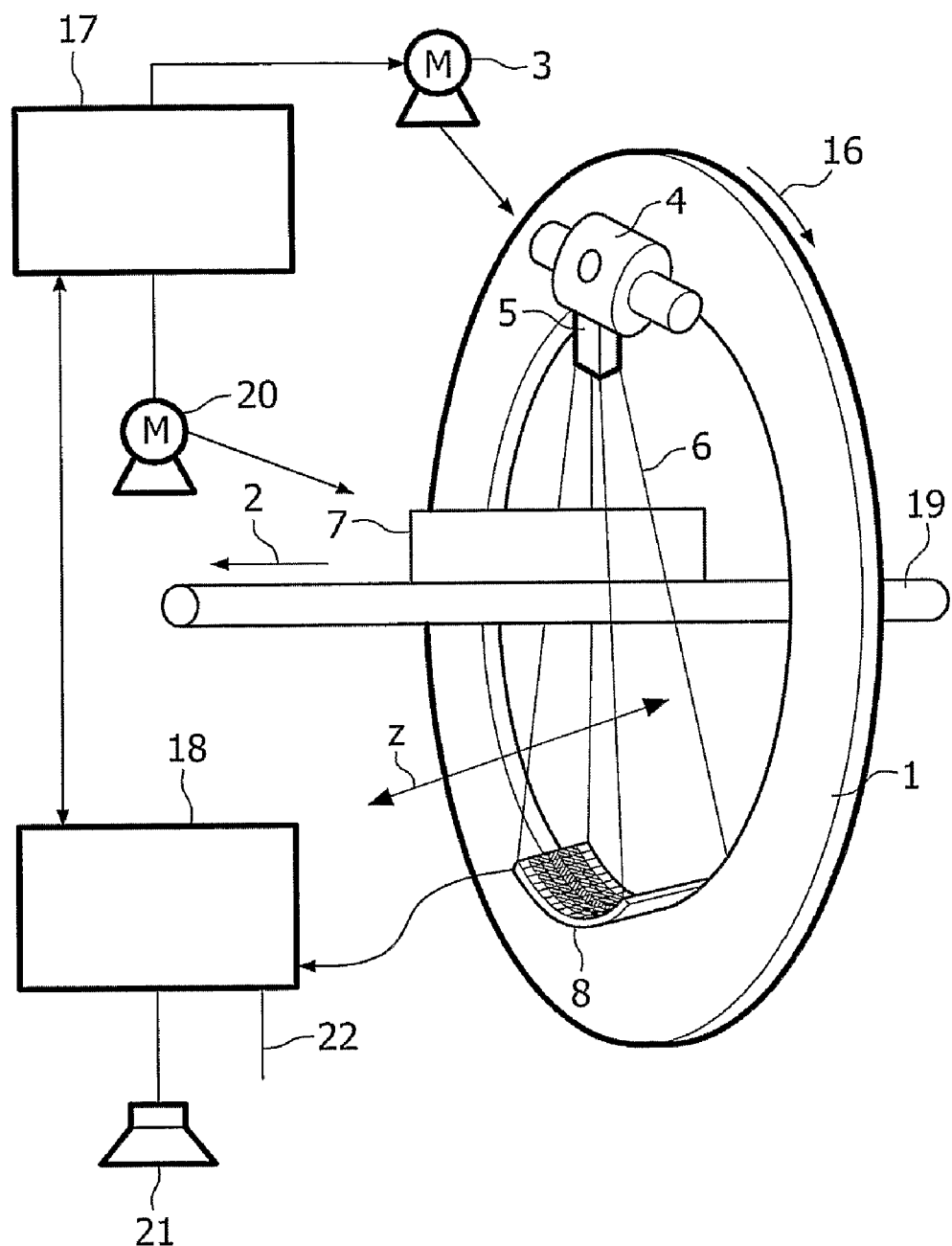
FIG. 1 shows a simplified schematic representation of an embodiment of a computer tomography (CT) scanner according to the present invention.

FIG. 1 shows a simplified schematic representation of an exemplary embodiment of a CT (computed tomography) scanner system according to the present invention. With reference to this exemplary embodiment, the present invention will be described for the application in medical imaging. However, it should be noted that the present invention is not limited to the application in the field of medical imaging, but may be used in applications such as baggage inspection to detect hazardous materials, such as explosives, in items of baggage or other industrial applications, such as material testing.

The scanner depicted in FIG. 1 is a cone beam CT scanner. The CT scanner depicted in FIG. 1 comprises a gantry 1, which is rotatable around a rotational axis 2. The gantry is driven by means of a motor 3. Reference numeral 4 designates a source of radiation such as an x-ray source, which, according to an aspect of the present invention, emits a polychromatic radiation.

Reference numeral 5 designates an aperture system, which forms the radiation beam emitted from the radiation source to a cone shaped radiation beam 6.

The cone beam 6 is directed such that it penetrates an object of interest 7 arranged in the center of the gantry 1, i.e. in an examination region of the CT scanner and impinges onto the detector 8. As may be taken from FIG. 1, the detector 8 is arranged on the gantry 1 opposite the source of radiation 4, such that the surface of the detector 8 is covered by the cone beam 6. The detector 8 depicted in FIG. 1 comprises a plurality of detector elements.

During a scan of the object of interest 7, the source of radiation 4, the aperture system 5 and detector 8 are rotated along gantry 1 in the direction indicated by arrow 16. For rotation of the gantry 1 with the source of radiation 4, the aperture system 5 and the detector 8, the motor 3 is connected to a motor control unit 17, which is connected to a calculation unit 18.

In FIG. 1, the object of interest is disposed on a conveyor belt 19. During the scan of the object of interest 7, while the gantry 1 rotates around the patient 7, the conveyor belt 19 displaces the object of interest 7 along a direction parallel to the rotational axis 2 of the gantry 1. By this, the object of interest 7 is scanned along a helical scan path. The conveyor belt 19 may also be stopped during the scans. Instead of providing a conveyor belt 19, for example, in medical applications, where the object of interest 7 is a patient, a movable table is used. However, it should be noted that in all of the described cases it is also possible to perform a circular scan, where there is no displacement in a direction parallel to the rotational axis 2, but only the rotation of the gantry 1 around the rotational axis 2.

The detector 8 is connected to the calculation unit 18. The calculation unit 18 receives the detection result, i.e. the read-outs from the detector element of the detector 8, and determines a scanning result on the basis of the read-outs. The detector elements of the detector 8 may be adapted to measure the attenuation caused to the cone beam 6 by the object of interest. Furthermore, the calculation unit 18 communicates with the motor control unit 17 in order to coordinate the movement of the gantry 1 with motor 3 and 20 or with the conveyor belt 19.

The calculation unit 18 may be adapted for reconstructing an image from read-outs of the detector 8. The image generated by the calculation unit 18 may be output to a display (not shown in FIG. 1) via an interface 22.

The calculation unit 18 which may be realized by a data processor may also be adapted to perform a motion compensation in the image based on the read-outs from the detector elements of the detector 8. According to an aspect of the present invention, this motion correction or compensation may be performed by selecting a first gating window, a second gating window and a third gating window comprising first, second and third projection data, and generating a motion map for all points of interest on the basis of the projection data of the first, second and third gating windows. After that, a motion compensated reconstruction may be performed on the basis of the motion map. It should be noted, that the first, second and third gating windows at least partially overlap.

Furthermore, it should be understood that, although an exemplary embodiment of the present invention uses three gating windows which are shifted with respect to each other (in the meaning that the second gating window starts at a point in time which is located before the start of the first gating window and that the third gating window starts after the start of the first gating window), also the usage of two timely shifted gating windows is possible; also it is possible to use four or five or any other bigger number of gating windows for motion estimation and motion map generation according to the present invention.

Furthermore, as may be taken from FIG. 1, the calculation unit 18 may be connected to allow speaker 21 to, for example, automatically output an alarm.

Figure 2:
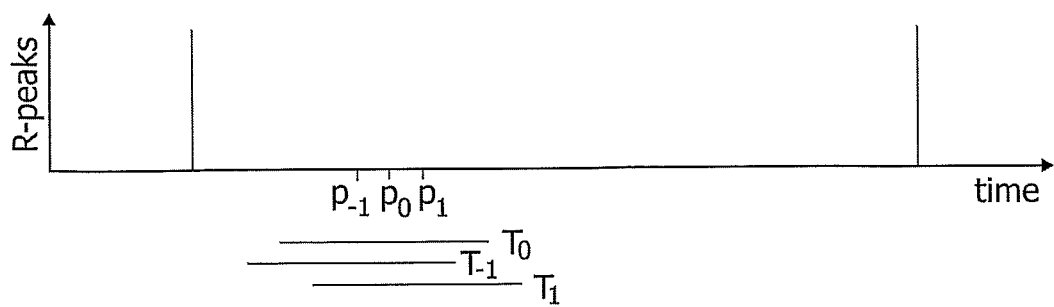
FIG. 2 shows a schematic representation of first, second and third gating windows $T_{-1}$, $T_0$ and $T_1$, respectively.

FIG. 2 shows a schematic representation of three different gating windows $T_{-1}$, $T_0$ and $T_1$ at three different corresponding phase points $p_{-1}$, $p_0$ and $p_1$. According to an exemplary embodiment of the methods of the present invention, motion within the window $T_0$ is estimated and the motion estimation information is used for improving the image quality.

As maybe seen from FIG. 2, the three gating windows overlap in a temporal sense and are positioned between the R peaks of the heart beat cycle. The R-peak is the most prominent peak in the electrocardiogram (ECG), which indicates the depolarization of the heart muscle. Since the contraction of the muscle follows the depolarization, the R-peak is seen as a reference point in the heart cycle. In order to compensate for variations in the duration of the heart cycle, phase points are typically specified as the relative distance between two succeeding R-peaks, e.g. 30% RR. Advantageously, the three gating windows almost overlap completely and are only slightly shifted with respect to each other, allowing for a usage of almost identical projection data for each gating window. Furthermore, the three phase points $p_{-1}$, $p_0$ and $p_1$ are positioned at a point in time of the heart beat cycle, where the movement of the heart is minimal.

Figure 3:
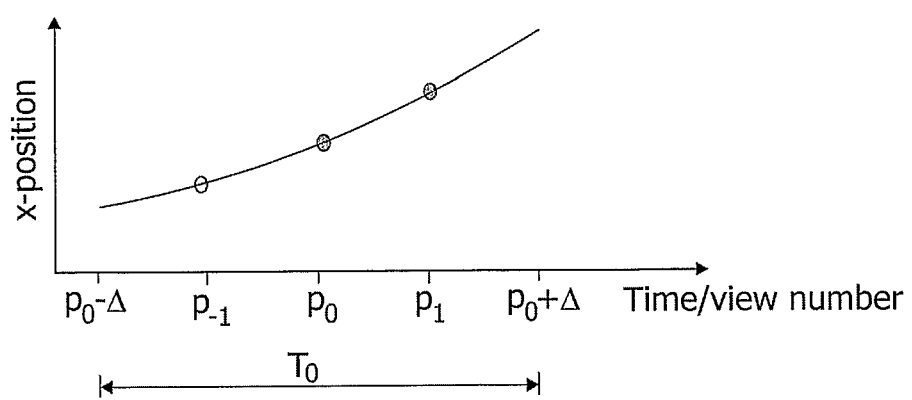
FIG. 3 shows reconstructed images of a heart at the first, the second and the third phase point $p_{-1}$, $p_0$ and $p_1$, respectively.

FIG. 3 shows reconstructed images of a heart at three different phase points or target phases $p_{-1}$, $p_0$ and $p_1$. Reconstructed image 32 shows the heart at the target phase $p_0$ which is located at 30% RR. Reconstructed image 31 shows the heart at a phase $p_{-1}$ located at 25% RR and reconstructed image 33 shows the heart at a phase $p_1$ located at 35% RR. Reconstructed images 31, 32 and 33 are images of the entire heart, wherein corresponding reconstructed images 34, 35 and 36 are enlargements of a specific section of images 31, 32 and 33, where a coronary artery transverses the slice. The arrow shown in the images always point at the same object point, i.e. the coronary artery.

As maybe seen from FIG. 3, the coronary artery moves from the left to the right, which leads to a smearing. A standard motion estimation technique, like the Block Matching Algorithm, which is described in T. Schäffter, V. Rasche, I. C. Carlsen, "Motion Compensated Projection Reconstruction", Magnetic Resonance in Medicine 41: 954-963 (1999), which is hereby incorporated by reference, may be used to determine the motion of the average position.

Figure 4:
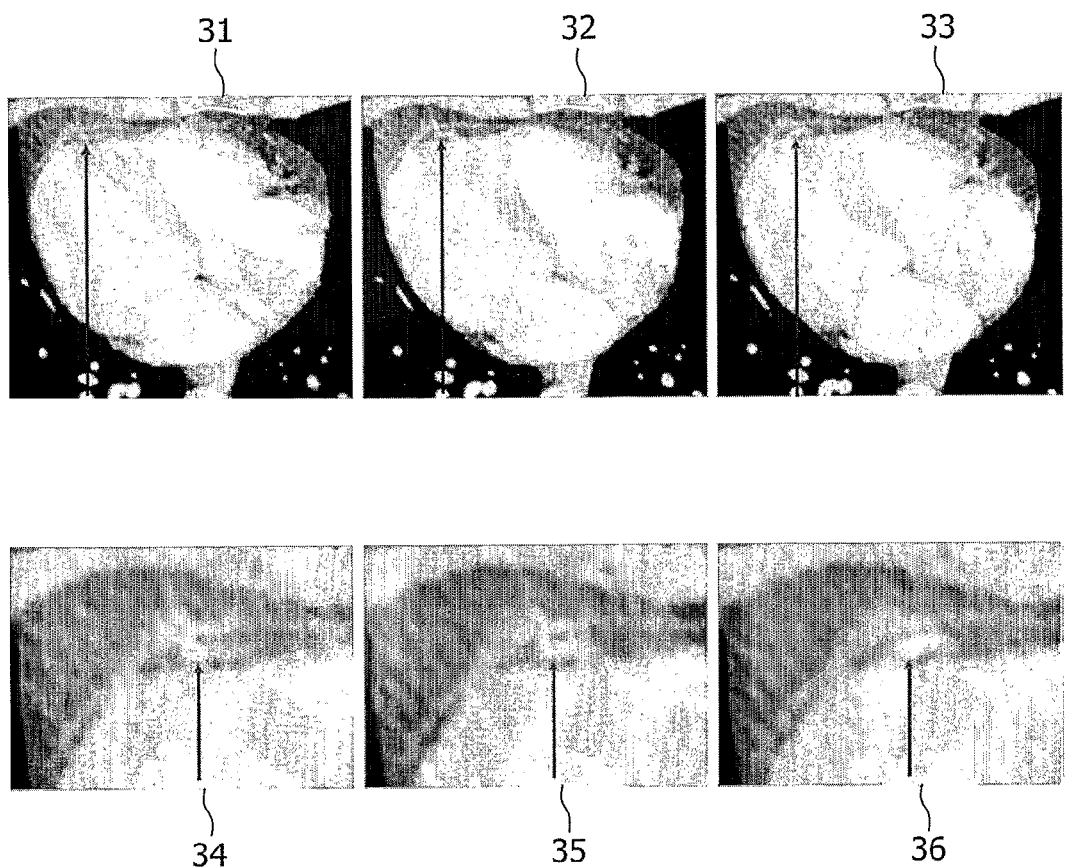
FIG. 4 shows the average position of a point of interest at the three phase points $p_{-1}$, $p_0$ and $p_1$.

If the temporal distance of the two further phase points $p_{-1}$, $p_1$ from the target phase point $p_0$ is small, then it can be assumed that the velocity changes only slightly within the three gating windows and a linear or quadratic model may be used to inter- and extrapolate the average position throughout the entire gating window $T_0$. This is illustrated in FIG. 4, which shows the x-position of a certain grid point, e.g. the coronary artery indicated in FIG. 3. The motion estimation provides the position and the three time points or phase points $p_{-1}$, $p_0$ and $p_1$, resulting in a motion map. The motion map may be calculated for all points of interest and for motions in x, y, and z-direction. Finally, the motion map may be used to perform a motion compensated reconstruction.

The motion map or motion field describes a motion and/or deformation of a point of interest or object of interest at a certain point of time.

Figure 5:
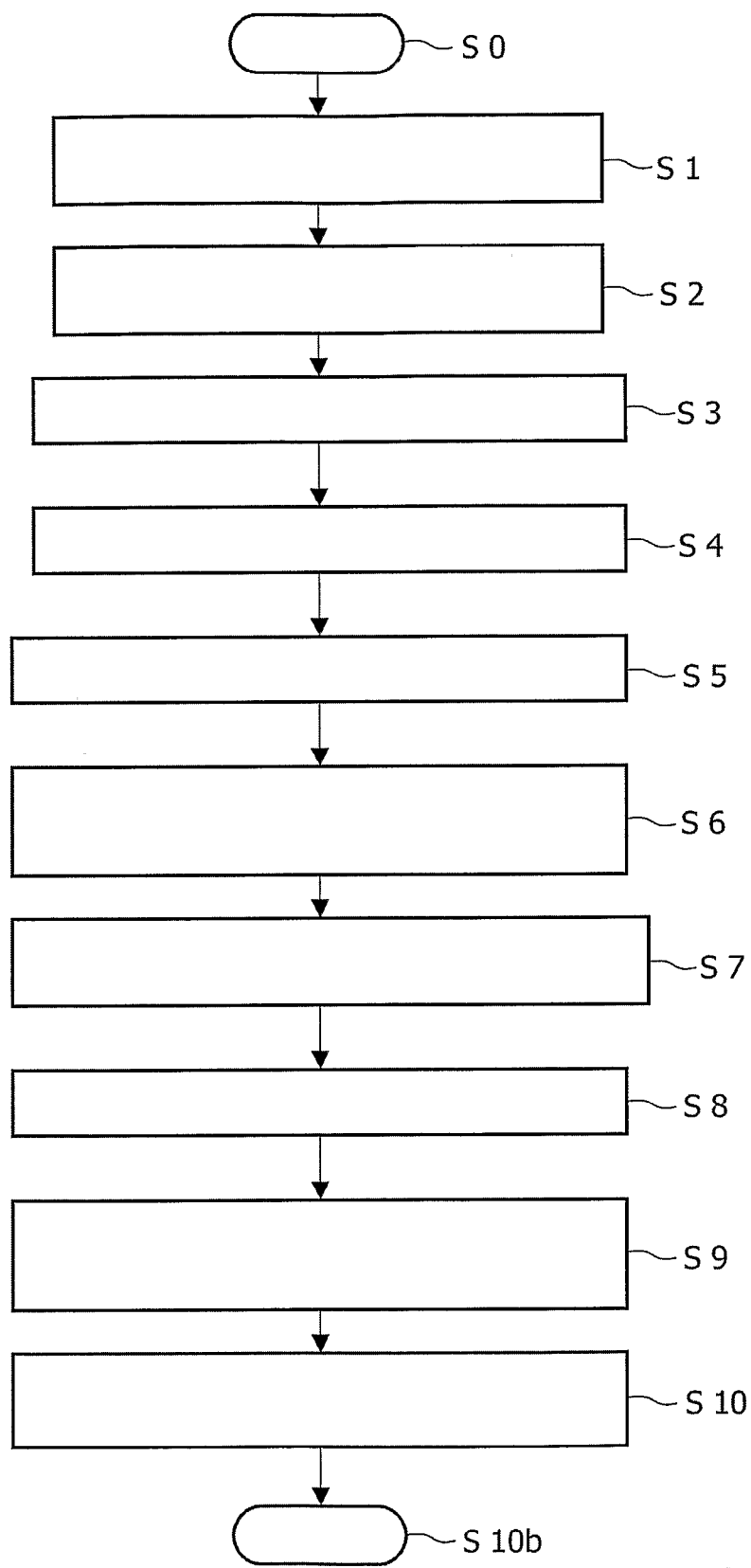
FIG. 5 shows a flow-chart of an exemplary embodiment of a method according to the present invention.

FIG. 5 shows a flow-chart of an exemplary embodiment of a method according to the present invention. After the start at step S0, the projection data are acquired (measured projection data) in step S1. This may, for example, be done by using a suitable CT scanner or by reading the projection data from a storage. In a subsequent step S2, a first phase point $p_0$ is selected. The selection of the phase point may be performed manually via a user or automatically from the software side. Then, in step S3, a first gating window $T_0=[p_0-\Delta; p_0+\Delta]$ is determined on the basis of the first phase point. In this corresponding cardiac gating window $T_0$ may either be specified by a user or determined automatically. After that, an image is reconstructed using a cardiac CT algorithm, which uses gating data, resulting in a reconstructed first image (step S4). The structures in this image represent the average position of the structures within the gating window $T_0$. In a further step (S5), two more phase points $p_{-1}$ and $p_1$ are determined and in step S6 corresponding second and third gating windows $T_{-1}$ and $T_1$ are determined on the basis of the second and third phase points, respectively. For example, the second gating window may be determined by $T_{-1}=[p_{-1}-\Delta; p_{-1}+\Delta]$ and the third gating window may be determined by $T_1=[p_1-\Delta; p_1+\Delta]$. According to this exemplary embodiment of the present invention, the second phase point is negatively shifted with respect to the first phase point and the third phase point is positively shifted with respect to the first phase point, meaning that $p_{-1}<p_0<p_1$.

It should be noted that, although in this exemplary embodiment of the present invention the three gating windows have the same size on the time axis, in other exemplary embodiments they may have different sizes.

After that, in step S7, a reconstruction of second and third images is performed using the same procedure as for the reconstruction of the first image. Then, in step S8, motion of an average position of an object point of interest or an object of interest is performed, e.g. by using a motion estimation technique like a block matching algorithm. Since the temporal difference between the target phase point and the second and third phase points is small, it can be assumed that the velocity of the point of interest changes only slightly within the three gating windows and therefore a linear or quadratic model may be used to inter- or extrapolate the average position of the point of interest throughout the entire gating window $T_0$, as indicated in FIG. 4.

After the determination of motion of the average position of a point of interest, a motion map for each point of interest and for motion in x, y, and z-direction is generated in step S9. This motion map or motion field describes the motion of each point of interest, for example relative to a chosen reference image. After that, in step S10, a motion compensated reconstruction algorithm may be performed on the basis of the motion map, resulting in a motion compensated reconstruction of the image and therefore in an improvement of image quality. The method ends in step S10b.

Figure 6:
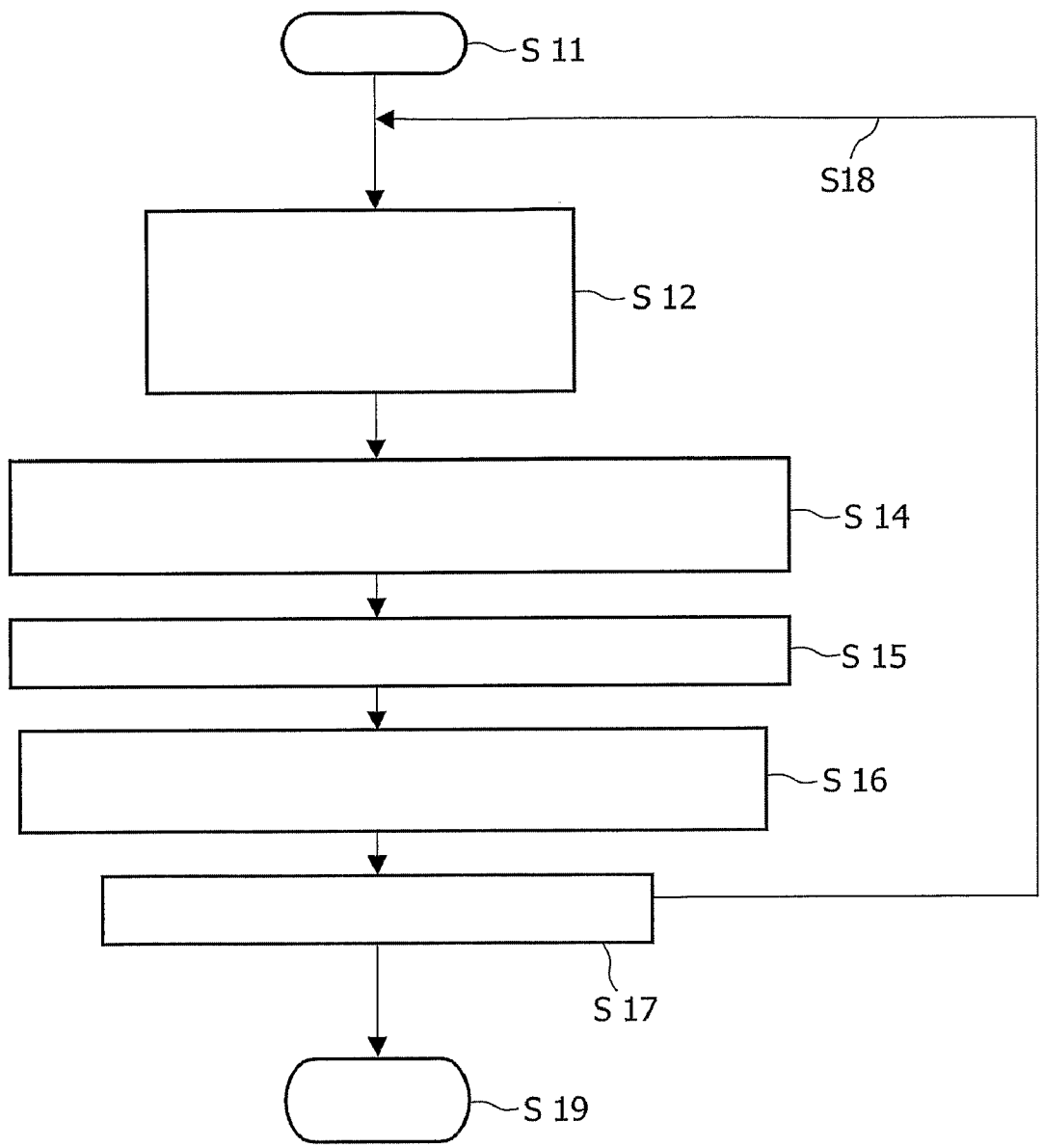
FIG. 6 shows a flow-chart of an iterative motion compensated reconstruction algorithm.

FIG. 6 shows a flow-chart of an iterative motion compensated reconstruction algorithm starting with step S11, which may be the generation of a motion map. After that, in step S12, a forward projecting of the first image using the motion map is performed, resulting in forward projected first image data.

The first image may, for example, be a homogeneous distribution, a filtered back-projection of the measured projection data or a simple back-projection of the measured projection data.

In step S14 a difference between the forward projected first image data and the measured projection data is determined. In other words, a comparison is made between the motion and/or deformation compensated first data and the projection actually measured. In a simple case, the difference may be determined on the basis of a subtraction.

Then, in step S15, the difference or error determined in step S14 is back-projected by using the motion map or motion field already used in step S12. This may simply be done by storing the integration weights of the individual voxels of the first image during the forward-projection in step S12. These integration weights define how strongly the voxel contributed to, for example, the line integrals. The same weights can be applied after proper normalisation during the back-projection in step S16. This results in a new updated first image on the basis of the back-projected difference. Then, the method continues to step S17, where it is determined whether an end criterion is met or not. The end criterion may, for example, be that the iteration was performed for all projections of the projection data or that the differences between the projection actually measured and the first image are be lower predetermined threshold. In case that is determined in step S17 that the end criterion is not met (step S18), the method continues with step S12, where the new first image is forward projected using the motion map resulting in first data. Steps S12 to S18 may be iteratively repeated until the end criterion is met. In case it is determined in step S17 that the end criterion is met, the method continues to step S19, where it ends.

It should be noted that, as apparent to the skilled person, the above described technique may be applied to all known iterative reconstruction techniques known in PET, SPECT, or CT imaging, such as, for example, RAMLA, ML-EM, OS-ML-EM, or ART.

Figure 7:
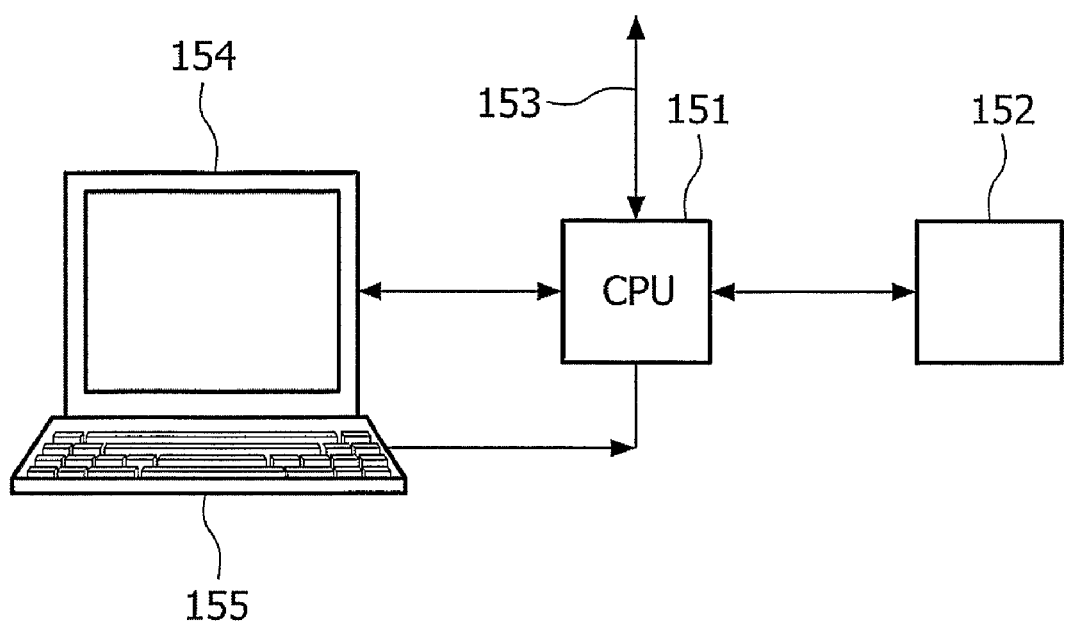
FIG. 7 shows an exemplary embodiment of an image processing device according to the present invention for executing an exemplary embodiment of a method in accordance with the present invention.

FIG. 7 depicts an exemplary embodiment of a data processing device according to the present invention for executing an exemplary embodiment of a method in accordance with the present invention. The data processing device depicted in FIG. 7 comprises a central processing unit (CPU) or image processor 151 connected to a memory 152 for storing an image depicting an object of interest, such as a patient. The data processor 151 may be connected to a plurality of input/output network or diagnosis devices, such as an MR device or a CT device. The data processor may furthermore be connected to a display device 154, for example, a computer monitor, for displaying information or an image computed or adapted in the data processor 151. An operator or user may interact with the data processor 151 via a keyboard 155 and/or other output devices, which are not depicted in FIG. 7.

Furthermore, via the bus system 153, it is also possible to connect the image processing and control processor 151 to, for example, a motion monitor, which monitors a motion of the object of interest. In case, for example, a lung of a patient is imaged, the motion sensor may be an exhalation sensor. In case the heart is imaged, the motion sensor may be an electrocardiogram (ECG).

The invention claimed is:

1. A method of motion compensation in a projection data set of an object of interest performed in conjunction with an imaging system, the method comprising the steps of: selecting a plurality of gating windows, the plurality of gating windows comprising a first gating window comprising first projection data and a second gating window comprising second projection data; estimating a motion of the object of interest on the basis of the projection data of the first and the second gating windows; performing a motion compensated reconstruction on the basis of the motion estimation; wherein the first and second gating windows at least partially overlap on a time axis, wherein the selection of the first gating window and the second gating window comprises the steps of: selecting a first phase point; determining the first gating window comprising first projection data, wherein the first gating window corresponds to the first phase point; selecting a second phase point on the basis of the first phase point; determining a second gating window comprising second projection data, wherein the second gating window corresponds to the second phase point.

2. The method according to claim 1, wherein the estimation of motion comprises the step of generating a motion map for the object of interest on the basis of the projection data of the first and second gating windows; and wherein the motion compensated reconstruction is performed on the basis of the motion map.

3. The method according to claim 2, wherein the object of interest comprises a plurality of points of interest; wherein the generation of the motion map comprises the steps of: reconstructing a first image on the basis of the first projection data; reconstructing a second image on the basis of the second projection data; and determining motion of an average position for each point of interest of the plurality of points of interest on the basis of the projection data of the first and second gating windows, resulting in the motion map.

4. The method according to claim 3, wherein the motion compensated reconstruction on the basis of the motion map comprises the steps of: forward projecting the first image by using the motion map, resulting in forward projected first image data; determining a difference between the forward projected first image data and the projection data; back-projecting the difference by using the motion map; and updating the first image on the basis of the back-projected difference.

5. The method according to claim 1, wherein the motion compensated reconstruction is performed iteratively until an end criterion has been fulfilled.

6. The method according to claim 1, wherein the second phase point is negatively shifted with respect to the first phase point.

7. The method according to claim 1, wherein the projection data set is acquired by means of a source of electromagnetic radiation generating a beam and by means of a radiation detector detecting the beam, wherein the source of electromagnetic radiation is a polychromatic x-ray source; wherein the source moves along a helical path around the object of interest; and wherein the beam has one of a cone beam and a fan beam geometry.

8. A data processing device, comprising: a memory for storing a data set; a data processor for performing motion compensation in a projection data set of an object of interest, wherein the data processor is adapted for performing the following operation: loading the projection data set; selecting a first gating window comprising first projection data and a second gating window comprising second projection data; estimating a motion of the object of interest on the basis of the projection data of the first and second gating windows; performing a motion compensated reconstruction on the basis of the motion estimation; wherein the first and second gating windows at least partially overlap on a time axis, wherein the selection of the first gating window and the second gating window comprises the steps of: selecting a first phase point; determining the first gating window comprising first projection data, wherein the first gating window corresponds to the first phase point; selecting a second phase point on the basis of the first phase point; determining a second gating window comprising second projection data, wherein the second gating window corresponds to the second phase point.

9. The data processing device according to claim 8, wherein the estimation of motion comprises the step of generating a motion map for the object of interest on the basis of the projection data of the first and second gating windows; and wherein the motion compensated reconstruction is performed on the basis of the motion map.

10. A CT scanner system, comprising: a memory for storing a data set; a data processor for performing motion compensation in a projection data set of an object of interest, wherein the data processor is adapted for performing the following operation: loading the projection data set acquired by means of a rotating source of electromagnetic radiation generating a beam and by means of a radiation detector detecting the beam; selecting a first gating window comprising first projection data and a second gating window comprising second projection data; estimating a motion of the of the object of interest on the basis of the projection data of the first and second gating windows; performing a motion compensated reconstruction on the basis of the motion estimation; wherein the first and second gating windows at least partially overlap on a time axis, wherein the selection of the first gating window and the second gating window comprises the steps of: selecting a first phase point; determining the first gating window comprising first projection data, wherein the first gating window corresponds to the first phase point; selecting a second phase point on the basis of the first phase point; determining a second gating window comprising second projection data, wherein the second gating window corresponds to the second phase point.

11. A computer program stored on a computer readable medium for performing motion compensation in a projection data set of an object of interest, wherein the computer program causes a processor to perform the following operation when the computer program is executed on the processor: loading the projection data set; selecting a plurality of gating windows, the plurality of gating windows comprising a first gating window comprising first projection data and a second gating window comprising second projection data; estimating a motion of the object of interest on the basis of the projection data of the first and the second gating windows; performing a motion compensated reconstruction on the basis of the motion estimation; wherein the first and second gating windows at least partially overlap on a time axis, wherein the selection of the first gating window and the second gating window comprises the steps of: selecting a first phase point; determining the first gating window comprising first projection data, wherein the first gating window corresponds to the first phase point; selecting a second phase point on the basis of the first phase point; determining a second gating window comprising second projection data, wherein the second gating window corresponds to the second phase point.

* * * * *